April 14, 1959     I. C. McKECHNIE     2,882,437
ELECTRO-HYDRAULIC POWER FEED
Filed Nov. 4, 1955     2 Sheets—Sheet 1
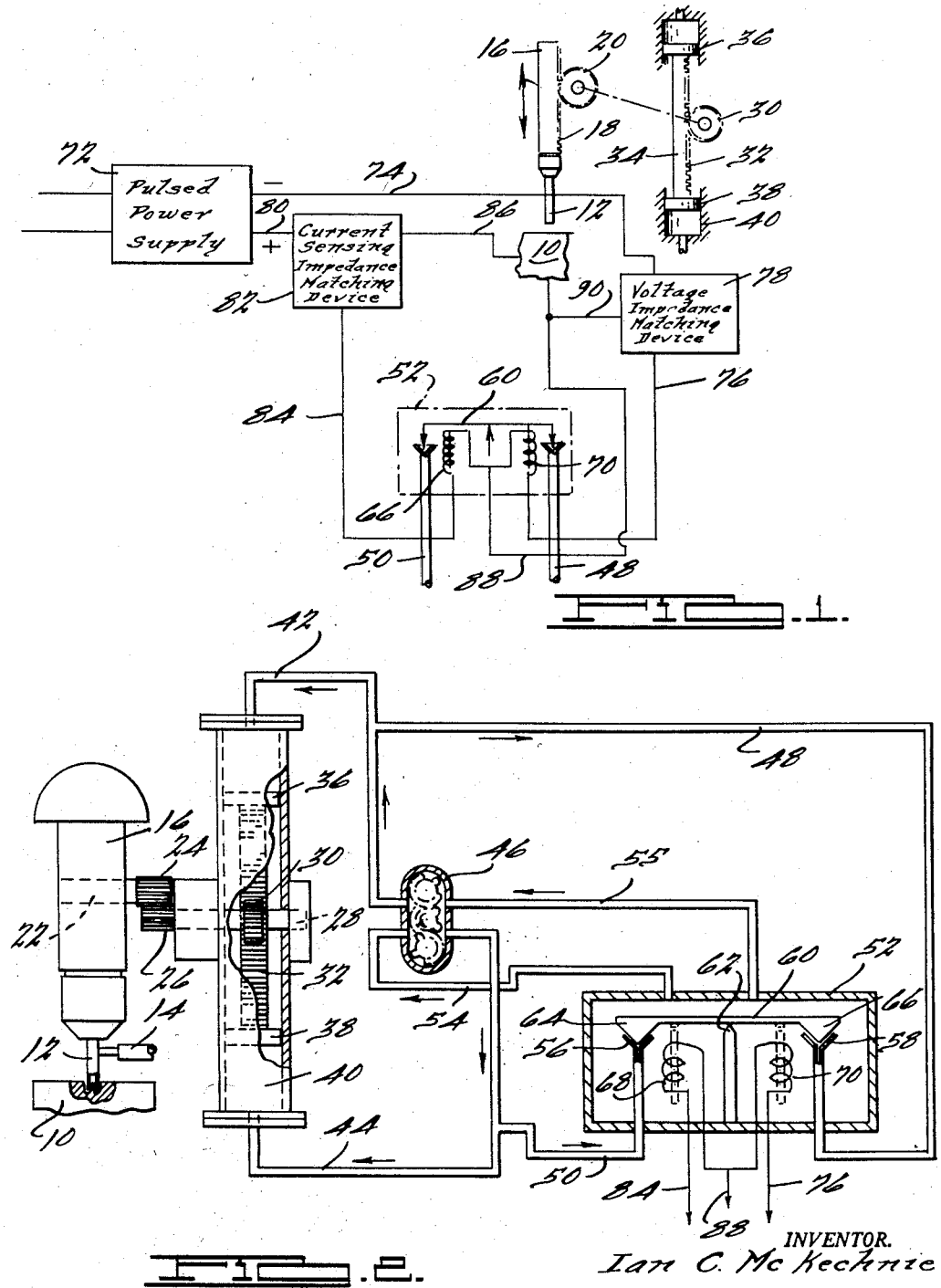
INVENTOR.
Ian C. McKechnie
BY
Maxwell R. Murphy
ATTORNEY United States Patent Office 2,882,437
Patented Apr. 14, 1959

2,882,437

ELECTRO-HYDRAULIC POWER FEED

Ian C. McKechnie, Detroit, Mich., assignor to Elox Corporation of Michigan, Clawson, Mich.

Application November 4, 1955, Serial No. 545,047

3 Claims. (Cl. 314—61)

This invention relates to electro-hydraulic and electro-mechanical servo-mechanisms and to electro-hydraulic and electro-mechanical power feed mechanisms for machine tools in particular.

More specifically, it relates to electrode feed mechanism for arc-machining apparatus. The arc-machining process (also called spark-machining and electrical-discharge machining) differs from other electrical metal working processes such as arc-piercing, welding, cutting and etching in that the machining action is based on the creation of a series of intermittent electrical discharges across a gap in the presence of a coolant.

In the use of such processes, the workpiece generally is maintained at positive potential and the electrode at negative potential for rapid machining and minimum tool erosion. For best accuracy and surface finish, it is important that the duration of the discharge (as it approaches the arc stage) be held to a minimum, but it is also important that the "off-time" not be excessive thus to avoid slowing the rate of metal removal.

In addition, it is now recognized that for best overall results so far as speed, accuracy and surface finish are concerned, it is vitally important that the discharge gap be maintained at all times of discharge in exact predetermined space relationship. Any discharges that occur at times when this precise gap distance is not maintained have an adverse effect on the quality of the work performed.

It is known also that, as the workpiece material is removed in the form of expulsed particles, these particles may form "stringers" (chains of adhered particles) which cause temporary "shorts" between the tool and workpiece and prevent discharging. Temporary short-circuits may also result from "core bending"—a deformation of the portion of the workpiece which projects into the electrode coolant passage resulting from strain relief.

It is therefore extremely desirable that the electrode be instantaneously withdrawn from the workpiece whenever a "short" occurs and be advanced immediately after the "short" has been cleared to resume the machining process. Various ways of accomplishing this have been proposed and some are in use. See, for example, McKechnie Patent No. 2,588,744 and my co-pending application Serial No. 260,002, now abandoned.

It is accordingly the primary object of my invention to provide an improved method and means for controlling the electrode feed in an arc-machining apparatus, although it is to be understood that my improvement is applicable to other types of machining apparatus.

Other objects and advantages will become apparent as the description progresses. Referring now to the following specification, taken together with the accompanying drawings, it will be seen that preferred embodiments of my invention have been disclosed.

In the drawings:

Fig. 1 is a schematic diagram of the electrical and hydraulic circuit of one form of my improved servo mechanism;

Fig. 2 is a somewhat more detailed schematic showing of the hydraulic components;

Figure 3:
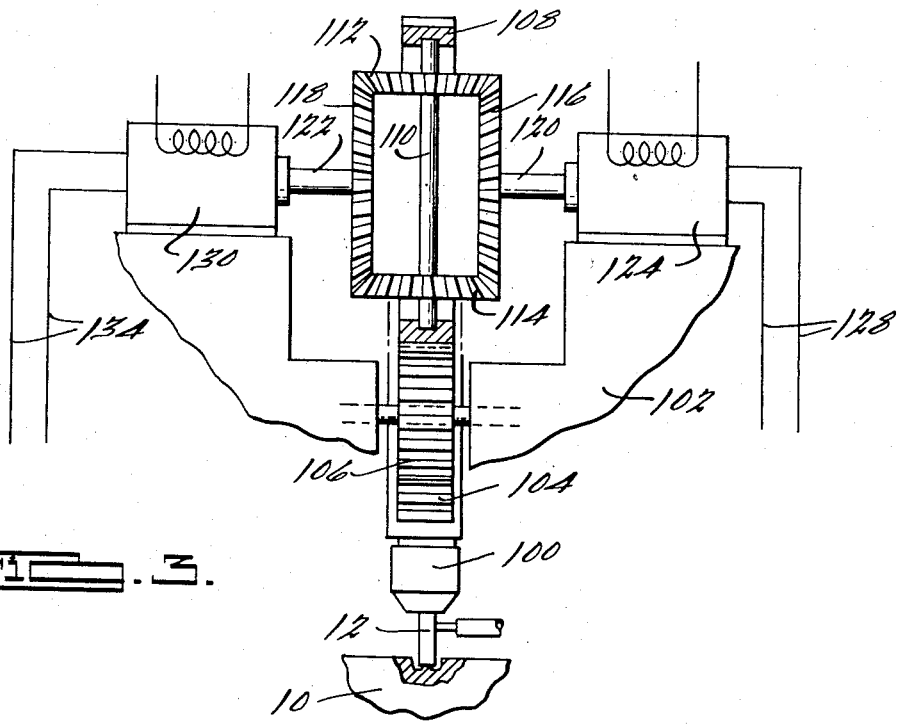
Fig. 3 is a schematic showing of a modified form of servo of the electro-mechanical type.

Referring to Figs. 1 and 2, it may be seen that I have shown a workpiece 10 which is being or is about to be machined by an electrode 12. Coolant is preferably supplied to the electrical discharge zone through a tube 14 (Fig. 2), and the proper relationship between the electrode and the workpiece is maintained by means of the servo-mechanism about to be described.

The electrode 12 is supported in a holder 16 suitably mounted by means not shown such that it may be moved linearly to feed or withdraw the electrode with respect to the work. The means for reciprocating the holder 16 comprises a rack 18 (Fig. 1) carried by the holder which is engaged by a gear 20.

The gear 20 is mounted on a common shaft 22 with a gear 24. The latter is meshed with a gear 26 which is, in turn, mounted on a common shaft 28 with a gear 30. The gear 30 engages a rack 32 carried by a piston rod 34. The piston rod 34 has pistons 36 and 38 on its respective opposite ends, which pistons reciprocate in the cylinder 40 in response to differential fluid pressure in the conduits 42, 44.

The fluid pressure for the system is generated by a double acting pump 46 of any suitable design driven by a motor (not shown). The pump is connected on its pressure side to opposite ends of the cylinder 40 by the conduits 42 and 44 respectively. The conduit 42 is also connected by a branch 48 with a balancing valve 52. The conduit 44 is similarly connected by means of a branch 50.

Return or suction conduits 54, 55, connect the valve 52 with the suction side of the pump, and a sump or pressure dome (not shown) may be provided if needed to prevent fluctuations in the fluid lines.

As shown in Fig. 2, the conduits 48 and 50 terminate inside the valve housing in conically flared end portions 56, 58. A balance lever 60 supported at its central portion by a knife edge or equivalent device 62 is provided at its opposite ends with conical portions 64, 66, which are received in the flared ends 56, 58. The lever 60 is intended to balance on its central point such that the portions 64—66 will normally offer equal resistance to flow of fluid from the conduits 48, 50.

Tipping of the lever 60 will tend to restrict or cut off the flow from one conduit and reduce restriction of the other with action similar to the movement of a needle valve. Means for tipping the lever 60 comprises a pair of magnets 68, 70. These magnets each have a conventional core and field coil and when energized will attract the lever 60 which in this case is the armature.

The means for controlling energization of the armatures now will be described.

The main power supply for the apparatus is indicated by numeral 72. This is preferably a pulsed power supply and may be similar to that described in Matulaitis copending application Serial No. 459,703, which power supply furnishes pulsed D.C. power and has adjustments to vary the energy delivered, duration of pulse and off-time. The power supply 72 is connected on its negative side by wire 74 to the electrode 12 and thence by wire 76 to the magnet 70, through a voltage sensing impedance matching device 78. The positive side of the power supply 72 is connected by a wire 80 to a current sensing impedance matching device 82 and thence by wire 84 to the coil of magnet 68. A wire 86 connects the positive side of the power supply to the workpiece 10 through the current sensing device 82, and the upper ends of the coils of magnets 68 and 70 are connected to the workpiece 10 by wire 88. Wire 88 is connected to the voltage sensing device 78 by a wire 90. The device 78 may under certain conditions be omitted, such as when the coil 70 is wound so that it responds efficiently to change in voltage across the gap.

If desired, the current sensing device 82 may be omitted and a variable reference voltage may be connected across the coil 68.

Thus it will be seen that current in coil 70 is responsive to gap voltage, the sensing device 78 being connected across the gap and the coil 70 being connected to the output of the device; and the current in coil 68 is responsive to the current flowing through the gap, the current sensing device 82 being connected in one side of the power circuit.

Operation of the apparatus is as follows:

Let it be assumed that the main power supply switch is off, that a workpiece is in place on the bed of the machine and that the electrode 12 is in its uppermost position.

The machining operation may be started by throwing the main switch which will cause the power supply 72 to be energized and, preferably, energize the coolant supply pump (not shown) and the pump 46. Immediately that the power supply 72 is energized, a voltage will appear across the gap between the electrode 12 and the workpiece 10, and the coil of magnet 70 will be energized thereby restricting the flow at orifice 58 and causing downward feeding of the electrode 12 due to increase in pressure in the top end of cylinder 40.

When the electrode 12 reaches a position at which discharge occurs across the gap, current will flow through the device 82 and a voltage will occur across coil 68 accompanied by some slight drop in voltage across the coil 70. The electrode will continue to feed downwardly until the average voltage at which discharges occur across the gap equals the preselected voltage initially set up on the machine control system. At that time, the average voltage across coil 68 will be substantially equal to that across coil 70, the lever 60 will balance and the restriction to flow of fluid will be substantially equal to each end of cylinder 40. This will result in equalization of pressures in each end of cylinder 40, and the electrode 12 will be held in optimum position.

Any change in the gap such as lengthening due to wear of the electrode or erosion of the work, or shortening due to accidental overtravel of electrode 12 downwardly or accumulation of particles in the gap area, will be immediately sensed and corrected by the devices 78 and 82 and the servomechanism.

Figure 4:
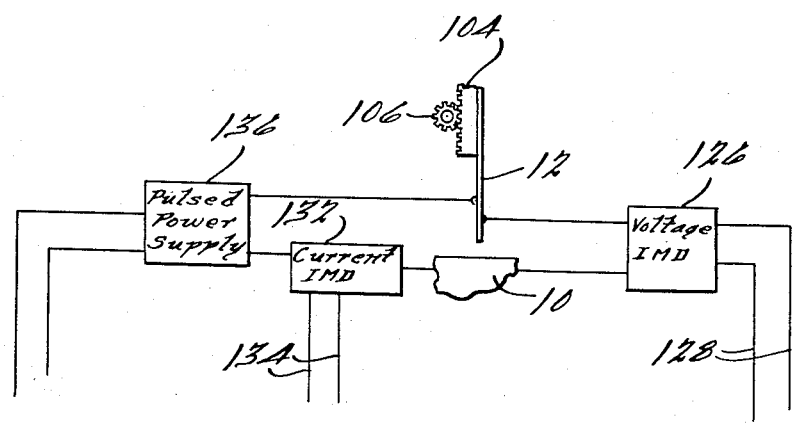
Fig. 4 is a wiring diagram of the Fig. 3 apparatus.

Reference will now be made to Figs. 3 and 4 wherein I have shown schematically a modified form of my invention in which the servo portion of the system is electro-mechanical rather than electro-hydraulic.

In this modification, the workpiece 10 is suitably supported on the bed of the machine (not shown) in such position that it may be machined by arc-discharge from the electrode 12. The latter is fixed in a holder 100 which may be supported on the machine frame 102 in any convenient manner for vertical reciprocation to permit feeding of the tool toward the work and withdrawal therefrom. The holder 100 carries a rack 104 which is engaged by a pinion 106.

The pinion 106 also engages a ring gear 108 carried by a carrier structure 110. The latter is part of a differential gearset which includes bevel gears 112 and 114 mounted on the carrier 110, and the bevel gears 116 and 118 which are fixed on the motor shafts 120 and 122 respectively. The shaft 120 carries the rotor of an electric motor 124, which rotor or armature is electrically connected to a voltage impedance matching device 126 by leads 128. The shaft 122 carries the armature of a motor 130 which is electrically connected to a current sensing device 132 by leads 134. The fields of both motors are preferably supplied from a separate, constant voltage source.

As may be seen from the circuit diagram of Fig. 4, the voltage matching device 126 is fed from the pulsed power supply 136, which power supply is also connected to the electrode and workpiece in accordance with usual practice. The current matching device 132 is connected in the lead between the power supply and the workpiece. It is clear, then, that motor 124 is sensitive to changes in arc voltage and motor 130 is sensitive to changes in arc current.

After positioning the electrode 12 in predetermined gap relation with respect to the workpiece 10, the voltages on the respective motor armatures may be adjusted such that their directions of rotation are opposite and their speeds are equal; consequently the speeds of the gears 116 and 118 will be equal and opposite and there will be no rotation of the carrier 110 or ring gear 108.

A drop in arc voltage accompanied by corresponding increase in arc current, indicating a closer approach of the electrode to the work, will cause motor 130 to rotate faster than the selected norm and the motor 124 to rotate slower than the selected norm, thereby causing, in turn, rotation of carrier 110 and ring gear 108 in a direction to propel electrode carrier 100 upwardly in a direction tending to restore the gap to predetermined size. Conversely, a rise in arc voltage accompanied by a corresponding drop in arc current, indicating widening of the gap, will speed up motor 124 and slow motor 130 and thus cause the electrode 12 to be fed toward the work.

This arrangement makes an extremely sensitive servo positioning device for the electrode in that there is no null point because even minute changes in the speeds of the two motors will cause rotation of the gear 108.

In some instances, it may be desirable to supply one of the servo motors from an independent source of reference voltage, in which case the other motor will be fed from a voltage-sensitive or a current-sensitive modulator.

While I have shown for illustrative purposes only two forms of my invention, changes in the form and arrangement thereof will readily occur to those skilled in the art, and it is therefore to be understood that I intend to limit the scope of my invention only as set forth in the appended claims.

I claim:

1. In an electrical-discharge-machining apparatus having an electrode and means for causing intermittent electrical discharge across a gap between said electrode and a conductive workpiece for eroding said workpiece, servo-means for continuously and automatically positioning said electrode in preselected space relationship with the workpiece comprising, a movable electrode holder, a hydraulic piston operatively associated with said holder such that movement of the piston effects corresponding movement of the electrode, a cylinder enclosing said piston and a pump for supplying pressure fluid to both ends of said cylinder for maintaining pressure on both sides of said piston, a balancing valve having a pair of discharge orifices connected respectively to each end of said cylinder, a balance lever operatively associated with said orifices for alternately restricting flow therefrom, magnetic means for controlling the position of said balance lever, and circuit means connecting said magnetic means with said gap such that said balance lever is operably responsive to changes in gap current and voltage.

2. In an electrical-discharge-machining apparatus having an electrode and means for causing intermittent electrical discharge across a gap between said electrode and a conductive workpiece for eroding said workpiece, servo-means for continuously and automatically positioning said electrode in preselected space relationship with the workpiece comprising, a movable electrode holder, a hydraulic piston operatively associated with said holder such that movement of the piston effects corresponding movement of the electrode, a cylinder enclosing said piston and a pump for supplying pressure fluid to both ends of said cylinder for maintaining pressure on both sides of said piston, a balancing valve having a pair of discharge orifices connected respectively to each end of said cylinder, a balance lever operatively associated with said orifices for alternately restricting flow therefrom, magnetic means for controlling the position of said balance lever, and circuit means connecting said magnetic means with said gap such that said balance lever is operably responsive to changes in gap current.

3. In an electrical-discharge-machining apparatus having an electrode and means for causing intermittent electrical discharge across a gap between said electrode and a conductive workpiece for eroding said workpiece, servo-means for continuously and automatically positioning said electrode in preselected space relationship with the workpiece comprising, a movable electrode holder, a hydraulic piston operatively associated with said holder such that movement of the piston effects corresponding movement of the electrode, a cylinder enclosing said piston and a pump for supplying pressure fluid to both ends of said cylinder for maintaining pressure on both sides of said piston, a balancing valve having a pair of discharge orifices connected respectively to each end of said cylinder, a balance lever operatively associated with said orifices for alternately restricting flow therefrom, magnetic means for controlling the position of said balance lever, and circuit means connecting said magnetic means with said gap such that said balance lever is operably responsive to changes in gap voltage.

References Cited in the file of this patent

UNITED STATES PATENTS

| | | |
|---|---|---|
| 2,094,867 | Baker | Oct. 5, 1937 |
| 2,422,362 | Moore | June 17, 1947 |
| 2,518,580 | Trofimov | Aug. 15, 1950 |
| 2,519,599 | Payne | Aug. 22, 1950 |
| 2,671,181 | Morey | Mar. 2, 1954 |
| 2,762,946 | Manchester | Sept. 11, 1956 |